(12) United States Patent
Nam et al.

(10) Patent No.: US 11,195,261 B2
(45) Date of Patent: Dec. 7, 2021

(54) IMAGE PROCESSING APPARATUS AND IMAGE PROCESSING METHOD

(71) Applicant: SAMSUNG ELECTRONICS CO., LTD., Suwon-si (KR)

(72) Inventors: Woo-hyun Nam, Seoul (KR); Il-jun Ahn, Suwon-si (KR); Tammy Lee, Seoul (KR); Ki-heum Cho, Seoul (KR); Yong-sup Park, Seoul (KR); Min-su Cheon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 35 days.

(21) Appl. No.: 16/348,584

(22) PCT Filed: Nov. 8, 2017

(86) PCT No.: PCT/KR2017/012627
§ 371 (c)(1),
(2) Date: May 9, 2019

(87) PCT Pub. No.: WO2018/088806
PCT Pub. Date: May 17, 2018

(65) Prior Publication Data
US 2020/0058113 A1 Feb. 20, 2020

(30) Foreign Application Priority Data
Nov. 9, 2016 (KR) .................. 10-2016-0148510

(51) Int. Cl.
*G06T 5/50* (2006.01)
*G06T 3/40* (2006.01)

(52) U.S. Cl.
CPC .............. *G06T 5/50* (2013.01); *G06T 3/4076* (2013.01)

(58) Field of Classification Search
CPC ... G06T 3/4007; G06T 3/4053; G06T 3/4076; G06T 5/50; G06T 7/33; G06T 2207/20016; G06T 2207/20221
See application file for complete search history.

(56) References Cited

U.S. PATENT DOCUMENTS

| | | | |
|---|---|---|---|
| 8,483,516 B2 | 7/2013 | Chien et al. | |
| 8,526,765 B2 | 9/2013 | Sakaguchi et al. | |

(Continued)

FOREIGN PATENT DOCUMENTS

| | | | |
|---|---|---|---|
| JP | 2011-188478 A | 9/2011 | |
| JP | 2013-168779 A | 8/2013 | |

(Continued)

OTHER PUBLICATIONS

Machine translation of JP2013168779A (Year: 2013).*

(Continued)

*Primary Examiner* — Katrina R Fujita
(74) *Attorney, Agent, or Firm* — Sughrue Mion, PLLC

(57) ABSTRACT

Disclosed is an image processing apparatus. The present image processing apparatus comprises: an input unit for inputting an image; and a processor for shrinking the inputted image to a predetermined ratio, extracting a visual feature from the shrunken image, performing an image quality enhancement process reflecting the extracted visual feature in the inputted image, repeatedly performing, for a predetermined number of times, the shrinking, the extracting, and the image quality enhancement process on the image that has undergone the image quality enhancement process. The present disclosure relates to an artificial intelligence (AI) system and an application thereof that simulate the functions of a human brain, such as recognition, judgment, etc., by using a machine learning algorithm such as deep learning, etc.

13 Claims, 8 Drawing Sheets

(56) References Cited

U.S. PATENT DOCUMENTS

| | | | |
|---|---|---|---|
| 9,378,541 B2 | 6/2016 | Kim | |
| 9,691,133 B1* | 6/2017 | Liu | G06T 5/50 |
| 9,984,442 B2 | 5/2018 | Turkan et al. | |
| 2007/0081743 A1 | 4/2007 | Kim | |
| 2011/0206296 A1 | 8/2011 | Sakaguchi et al. | |
| 2013/0016920 A1* | 1/2013 | Matsuda | G06T 3/4053 |
| | | | 382/299 |
| 2014/0086506 A1* | 3/2014 | Ichikawa | G06T 5/005 |
| | | | 382/264 |
| 2014/0368509 A1* | 12/2014 | Lin | G06T 5/003 |
| | | | 345/428 |
| 2014/0368549 A1* | 12/2014 | Lin | G06T 3/4076 |
| | | | 345/660 |
| 2015/0010245 A1* | 1/2015 | Kim | G06T 5/002 |
| | | | 382/254 |
| 2015/0093045 A1* | 4/2015 | Turkan | G06T 5/50 |
| | | | 382/299 |
| 2016/0189357 A1* | 6/2016 | Shibata | G06K 9/40 |
| | | | 382/197 |
| 2018/0075581 A1* | 3/2018 | Shi | G06T 3/4053 |

FOREIGN PATENT DOCUMENTS

| | | | | |
|---|---|---|---|---|
| KR | 10-2007-0039432 A | | 4/2007 | |
| KR | 10-2013-0092188 A | | 8/2013 | |
| KR | 10-2015-0004167 A | | 1/2015 | |
| KR | 10-2016-0115925 A | | 10/2016 | |
| WO | WO-2015113826 A1 | * | 8/2015 | G06T 3/4076 |

OTHER PUBLICATIONS

Glasner et al. "Super-resolution from a single image." 2009 IEEE 12th international conference on computer vision. IEEE, 2009. (Year: 2009).*

Sugie et al. "Performance verification of super-resolution image reconstruction." 2013 International Symposium on Intelligent Signal Processing and Communication Systems. IEEE, 2013. (Year: 2013).*

Zhang et al. "Single image super-resolution with multiscale similarity learning." IEEE transactions on neural networks and learning systems 24.10 (2013): 1648-1659. (Year: 2013).*

Communication dated Mar. 31, 2020 issued by the European Intellectual Property Office in counterpart European Application No. 17 870 527.3.

Kim, et al., "Accurate Image Super-Resolution Using Very Deep Convolutional Networks", 2016, IEEE Conference on Computer Vision and Pattern Recognition (CVPR), pp. 1646-1654, 9 pages total.

Search Report dated Mar. 22, 2018, issued by the International Searching Authority in counterpart International Patent Application No. PCT/KR2017/012627 (PCT/ISA/210).

Written Opinion dated Mar. 22, 2018, issued by the International Searching Authority in counterpart International Patent Application No. PCT/KR2017/012627 (PCT/ISA/237).

Communication dated Jul. 24, 2019, issued by the European Patent Offiec in counterpart European Application No. 17870527.3.

Irani, M., et al., "Improving Resolution by Image Registration", May 1, 1991, CVGIP Graphical Models and Image Processing, vol. 53, No. 3, XP000200576, p. 231-239, 9 pages total.

Freedman, G., et al., "Image and Video Upscaling from Local Self-Examples", Apr. 22, 2011, ACM Transactions on Graphics, vol. 30, No. 2, XP058001113, 11 pages total.

Glasner, D., et al., "Super-Resolution from a Single Image", Sep. 29, 2009, 2009 IEEE 12th International Conference on Computer Vision (ICCV), XP031672601, p. 349-356, 8 page total.

Communication dated Aug. 31, 2020 by the Korean Intellectual Property Office in counterpart Korean Patent Application No. 10-2016-0148510.

Communication dated Nov. 24, 2020 issued by the European Patent Office in application No. 17870527.3.

Communication dated Mar. 30, 2021, issued by the Korean Patent Office in counterpart Korean Patent Application No. 10-2016-0148510.

Communication dated Jul. 29, 2021 issued by the European Intellectual Property Office in counterpart European Application No. 17 870 527.3.

Communication dated Sep. 20, 2021 issued by the Indian Patent Office in counterpart Indian Application No. 201947021826.

* cited by examiner

70

IMAGE PROCESSING APPARATUS AND IMAGE PROCESSING METHOD

TECHNICAL FIELD

The disclosure relates to an image processing apparatus, an image processing method, and a computer-readable recording medium, and more particularly, to an image processing apparatus and an image processing method for generating a high-definition image.

BACKGROUND ART

An artificial intelligence (AI) system is a computer system implementing human-like intelligence, and a system in which a machine performs learning, makes decision, and becomes smart by itself unlike an existing rule-based smart system. As the artificial intelligence system is used more and more, a recognition rate is improved and a user's taste may be more accurately understood, such that the existing rule-based smart system has been gradually replaced by a deep learning-based artificial intelligence system.

An artificial intelligence technology is constituted by machine learning (deep learning) and element technologies using the machine learning.

The machine learning is an algorithm technology of classifying/learning features of input data by itself, and the element technology is a technology of simulating functions of a human brain, such as recognition, judgment, and the like using a machine learning algorithm such as deep learning, or the like, and is constituted by technical fields such as linguistic understanding, visual understanding, inference/prediction, knowledge representation, a motion control, and the like.

Various fields to which the artificial intelligence technology is applied are as follows. The linguistic understanding is a technology of recognizing and applying/processing human languages, and includes natural language processing, machine translation, a dialog system, question and answer, speech recognition/synthesis, and the like. The visual understanding is a technology of recognizing and processing things like human vision, and includes object recognition, object tracking, image search, human recognition, scene understanding, space understanding, image improvement, and the like. The inference/prediction is a technology of deciding and logically inferring and predicting information, and includes knowledge/probability-based inference, optimization prediction, preference-based planning, recommendation, and the like. The knowledge representation is a technology of automating and processing human experience information as knowledge data, and includes knowledge construction (data creation/classification), knowledge management (data utilization), and the like. The motion control is a technology of controlling self-driving of a vehicle and a motion of a robot, and includes a motion control (navigation, collision, driving), a manipulation control (behavior control), and the like.

Meanwhile, many studies on image quality enhancement in terms of a peak signal-to-noise ratio (PSNR), structural similarity (SSIM), and the like which are commonly used in a quantitative image quality assessment have been conducted. However, because the image quality is affected by various factors such as a sensibility or a taste of a human, there is a limitation in enhancing an image quality in a cognitive perspective by using current technologies.

Recent technologies for enhancing an image quality may be largely divided into a method of not using an external database and a method of using an external database. As the method of not using an external database, super-resolution using very deep convolutional networks (VDSR) have been developed. However, this technology is not sufficiently effective in a case of a pattern region with regularity and a region in which a texture region with many high frequency components such as grass or fabric, and the pattern region are mixed. Although the technologies using an external database may enhance an image quality to some extent even in the case of the pattern region and the region in which the texture region and the pattern region are mixed, a memory of 200 MB is used, and thus there is a difficulty in applying the technologies using an external database to a television or a mobile terminal.

Accordingly, there is a demand for a technology capable of enhancing an image quality of a low-definition image including a pattern region without using an external database.

DISCLOSURE

Technical Problem

The disclosure provides an image processing apparatus and an image processing method capable of generating a high-definition image by using a received low-definition image without using an external database.

Technical Solution

According to an embodiment of the disclosure, an image processing apparatus includes: an input unit configured to receive an image; and a processor configured to reduce the received image to a predetermined ratio, extract a visual feature from the reduced image, perform an image quality enhancement process in which the extracted visual feature is reflected in the received image, and repeatedly perform, for a predetermined number of times, the reducing, the extracting, and the image quality enhancement process on the image subjected to the image quality enhancement process.

The processor may perform the image quality enhancement process by partitioning the received image into a plurality of regions each of which has a size corresponding to a size of the reduced image, reflecting the extracted visual feature in each of the plurality of partitioned regions, and overlapping the plurality of regions, in which the extracted visual feature is reflected, with each other.

The processor may reduce the received image based on each of a plurality of reference points in the received image and extract a visual feature from each of a plurality of reduced images.

The plurality of reference points may correspond to the plurality of regions, respectively, and the processor may reflect visual features in the plurality of partitioned regions, respectively, the visual features being extracted from the images reduced based on the reference points corresponding to the plurality of regions.

The extracted visual feature may be at least one of a brightness, a color, a darkness, a saturation, a contrast, shapes and density of edges, or a color arrangement.

The predetermined ratio may be a value in a range from 0.9 to 0.99.

The processor may determine a degradation state of the received image, and determine the predetermined number of times for which the reducing, the extracting, and the image quality enhancement process are repeatedly performed, depending on the determined degradation state.

The processor may perform a pre-processing for enhancing an image quality of the received image, and perform the image quality enhancement process by reflecting the visual feature extracted from a reduced image in which the pre-processed image is reduced by the predetermined ratio, on the pre-processed image.

The processor may determine whether or not a pattern region having a predetermined frequency range is included in the received image, repeatedly perform the reducing, the extracting, and the image quality enhancement process on the pattern region in a case in which the pattern region is included in the received image, and perform the reducing, the extracting, and the image quality enhancement process on a region other than the pattern region only once.

The image processing apparatus may further include: a display configured to display the image repeatedly subjected to the image quality enhancement process for the predetermined number of times.

The image processing apparatus may further include: a communicator configured to transmit, to a display device, the image repeatedly subjected to the image quality enhancement process for the predetermined number of times.

According to another embodiment of the disclosure, an image processing method includes: receiving an image; reducing the received image to a predetermined ratio; extracting a visual feature from the reduced image; performing an image quality enhancement process in which the extracted visual feature is reflected in the received image; and repeatedly performing, for a predetermined number of times, the reducing, the extracting, and the image quality enhancement process on the image subjected to the image quality enhancement process.

The performing of the image quality enhancement process may include: partitioning the received image into a plurality of regions each of which has a size corresponding to a size of the reduced image, reflecting the extracted visual feature in each of the plurality of partitioned regions, and overlapping the plurality of regions, in which the extracted visual feature is reflected, with each other.

In the reducing, the received image may be reduced based on each of a plurality of reference points, and in the extracting, a visual feature may be extracted from each of a plurality of reduced images.

The plurality of reference points may correspond to the plurality of regions, respectively, and in the reflecting, visual features may be reflected in the plurality of partitioned regions, respectively, the visual features being extracted from the images reduced based on the reference points corresponding to the plurality of regions.

The image processing method may further include: determining a degradation state of the received image, and determining the predetermined number of times for which the reducing, the extracting, and the image quality enhancement process are repeatedly performed, depending on the determined degradation state.

The image processing method may further include: performing a pre-processing for enhancing an image quality of the received image, and in the performing of the image quality enhancement process by reflection a visual feature extracted from a reduced image in which the pre-processed image is reduced by the predetermined ratio, on the pre-processed image.

The image processing method may further include determining whether or not a pattern region having a predetermined frequency range is included in the received image, and in the repeatedly performing of image quality enhancement process for the predetermined number of times, the reducing, the extracting, and the image quality enhancement process are repeatedly performed on the pattern region in a case in which the pattern region is included in the received image, and the reducing, the extracting, and the image quality enhancement process may be performed on a region other than the pattern region only once.

The image processing method may further include: displaying the image repeatedly subjected to the image quality enhancement process for the predetermined number of times.

The image processing method may further include: transmitting, to a display device, the image repeatedly subjected to the image quality enhancement process for the predetermined number of times.

MODE FOR INVENTION

Figure 1:
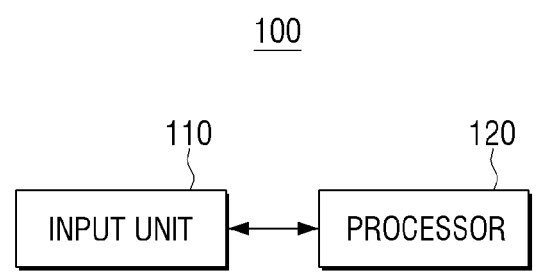
FIG. 1 is a block diagram for describing a schematic configuration of an image processing apparatus according to an embodiment of the disclosure.

After terms used in the specification are briefly described, the disclosure will be described in detail.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure should be defined based on the meaning of the terms and the contents throughout the disclosure rather than simple names of the terms.

Because the disclosure may be variously modified and have several embodiments, specific embodiments of the disclosure will be illustrated in the drawings and be described in detail in the detailed description. However, it is to be understood that the disclosure is not limited to specific embodiments, but includes all modifications, equivalents, and substitutions without departing from the scope and spirit of the disclosure. In a case where it is decided that a detailed description for the known art related to the disclosure may obscure the gist of the disclosure, the detailed description will be omitted.

Terms "first", "second", and the like, may be used to describe various components, but the components are not to be construed as being limited by these terms. The terms are used only to distinguish one component from another component.

Singular forms are intended to include plural forms unless the context clearly indicates otherwise. It will be further understood that terms "include" or "formed of" used in the specification specify the presence of features, numerals, steps, operations, components, parts, or combinations thereof mentioned in the specification, but do not preclude the presence or addition of one or more other features, numerals, steps, operations, components, parts, or combinations thereof.

In embodiments, a "module" or a "-er/or" may perform at least one function or operation, and be implemented by hardware or software or be implemented by a combination of hardware and software. In addition, a plurality of "modules" or a plurality of "-ers/ors" may be integrated in at least one module and be implemented by at least one processor except for a "module" or an "-er/or" that needs to be implemented by specific hardware.

Hereinafter, embodiments of the disclosure will be described in detail with reference to the accompanying drawings so that those skilled in the art to which the disclosure pertains may easily practice the disclosure. However, the disclosure may be modified in various different forms, and is not limited to embodiments described herein. In addition, in the drawings, portions unrelated to the description will be omitted to obviously describe the disclosure, and similar reference numerals will be used to describe similar portions throughout the specification.

Hereinafter, the disclosure will be described in more detail with reference to the drawings.

FIG. 1 is a block diagram for describing a schematic configuration of an image processing apparatus according to an embodiment of the disclosure.

Referring to FIG. 1, an image processing apparatus 100 includes an input unit 110 and a processor 120. Here, the image processing apparatus 100 may be implemented in a form of a set-top box or a server processing an input image and transmitting the image to a separate display device. However, the image processing apparatus 100 is not limited thereto and may be a display device such as a television (TV), a personal computer (PC), a mobile device, or the like including a display, which may display an image by itself.

The input unit 110 may receive a low-definition image. In detail, the input unit 110 may receive an image from the outside in a wired or wireless manner, or may receive an image to be processed according to selection by a user among a plurality of stored images. For example, the input unit 110 may receive an image through an antenna or a cable, or receive an image selected by the user from a storage (not illustrated).

The processor 120 may generate a high-definition image obtained by up-scaling the image input through the input unit 110. In detail, the processor 120 may generate the high-definition image by reducing the received low-definition image, extracting a visual feature of the reduced image, and reflecting the extracted visual feature in the received low-definition image. In this case, the processor 120 may generate the high-definition image by partitioning the received image into a plurality of regions each of which has a size corresponding to a size of the reduced image, and applying the extracted visual feature in each partitioned region.

Here, the up-scaling means correction of a stretched pixel in a low-definition image for obtaining a high-definition image. In a case in which a screen having the same size as that of an original screen is used, a clearer and sharper image may be obtained in comparison to that on the original screen, and in a case in which a screen having a larger size than that of the original screen is used, an image with an undegraded image quality may be obtained.

Further, the visual feature is a feature which may be recognized by the user when the user views the image with naked eyes, and may include a texture feature indicating a texture which may be felt from a frequency form of an image signal of each region in the image, shapes and density of edges included in the image, a color arrangement, or the like, in addition to attributes of the image, such as a brightness, a color, a darkness, a saturation, a contrast, and the like of the reduced image.

Here, the processor 120 may reduce the received low-definition image to a predetermined ratio, extract a visual feature from the reduced image, and perform an image quality enhancement process, in which the extracted visual feature is reflected in the received image, on the received image. Here, the predetermined ratio may be a minimum reduction ratio at which enhancement in image quality may be visually confirmed when performing the image quality enhancement process, and may be called a unit scale factor. At this time, the predetermined ratio may be determined by the user and may be a value in a range from 0.9 to 0.99. Preferably, the predetermined ratio may be 0.95.

Meanwhile, the processor 120 may repeatedly perform the same image quality enhancement process on the image subjected to the image quality enhancement process once. In detail, an image with a further enhanced image quality in comparison to that of the image subjected to the image quality enhancement process once may be obtained by reducing the image subjected to the image quality enhancement process once to the predetermined ratio, extracting a visual feature from the reduced image, and reflecting the extracted visual feature in the image subjected to the image quality enhancement process once. As such, a high-definition image with a desired image quality may be generated by repeatedly performing the image quality processing for a predetermined number of times. At this time, the predetermined number of times may be determined by comparing an optimized scale factor and the unit scale factor with each other. In detail, the predetermined number of times may be determined by comparing a reduction ratio, at which a high-definition image may be generated by performing the image quality enhancement process once, and the minimum reduction ratio with each other. The process will be described in more detail with reference to FIG. 3 later.

As such, according to the disclosure, a high-definition image may be generated by reducing a low-definition image and using a visual feature extracted from the reduced low-definition image without an external database, thereby reducing memory footprint. Further, the image quality enhancement process is repeatedly performed by using the minimum reduction ratio at which an image quality is enhanced, thereby generating the high-definition image without a distorted region in the image.

Meanwhile, the processor 120 may partition the received image into a plurality of regions each of which has a size corresponding to a size of the reduced image. Here, the plurality of regions may partially overlap each other. At this time, the processor 120 may perform the image quality enhancement process by reflecting the visual feature extracted from the reduced image in each of the plurality of partitioned regions, and overlapping the plurality of regions, in which the visual feature is reflected, with each other.

Here, the visual feature reflected in the received image may be extracted from the image reduced based on each of a plurality of reference points in the received image. Meanwhile, the plurality of reference points may correspond to the plurality of regions, respectively. The processor 120 may perform the image quality enhancement process by reflecting the visual feature extracted from the image reduced based on the reference points corresponding to the plurality of regions, in the plurality of partitioned regions. Meanwhile, a method of performing the image quality enhancement process by reflecting the extracted visual feature will be described in detail with reference to FIG. 4 later.

An effect of reducing image distortion occurring in the repeated image quality enhancement process may be expected by performing the image quality enhancement process in which the received image is partitioned into the plurality of regions, the extracted visual feature is reflected in each of the plurality of regions, and overlapping the plurality of regions with each other as described above.

Meanwhile, the processor 120 may generate a high-definition image by repeatedly performing the image quality enhancement process on the received image for a predetermined number of times. At this time, the predetermined number of times may be determined by comparing the optimized scale factor for generating a high-definition image based on a low-definition image, and the unit scale factor with each other.

Here, the scale factor is a factor for determining a degree of reduction of the received image, and may be a value between 0 and 1. In this case, the optimized scale factor may be a value determined in advance through machine learning. For example, in a case in which a high-definition original image is present, the processor 120 may determine the scale factor so that an image obtained by processing a low-definition image of the original image is similar to the original image as far as possible. In this case, the processor 120 may perform the same operation for a plurality of original images to determine a scale factor for processing low-definition images so that images obtained by processing the low-definition images are similar to the original images as far as possible. A method of determining the optimized scale factor by using similarity will be described in detail with reference to FIG. 5 later.

Meanwhile, the processor 120 may determine the optimized scale factor depending on a degree of degradation of a low-definition image. In detail, the image processing apparatus 100 may store a plurality of pieces of scale factor information corresponding to a plurality of degrees of degradation of an image, respectively, in advance, and in this case, the plurality of pieces of scale factor information may be stored in a form of a lookup table. Meanwhile, a method of determining the optimized scale factor depending on a degree of degradation of an image will be described in detail with reference to FIG. 6 later.

Meanwhile, the processor 120 may enhance an image quality of the received image before reducing the received image. In detail, the processor 120 may primarily enhance the image quality of the image according to an algorithm conventionally used for image quality enhancement, and then perform the image processing for image quality enhancement according to the embodiment of the disclosure.

Meanwhile, the processor 120 may extract the visual feature from the reduced image itself, but the disclosure is not limited thereto. The processor 120 may also extract the visual feature in a state in which the received image is arranged as it is in a region other than a region in which the reduced image is arranged in the received image. In this case, the image processing apparatus may recognize the region in which the reduced image is arranged in the received image as a reliable region with little possibility of distortion, and recognize the remaining region as an unreliable region with high possibility of distortion.

Meanwhile, the processor 120 may generate a high-definition image by reflecting the extracted visual feature only in some regions in the received image. This will be described in detail with reference to FIGS. 7 and 8 later.

Figure 2:
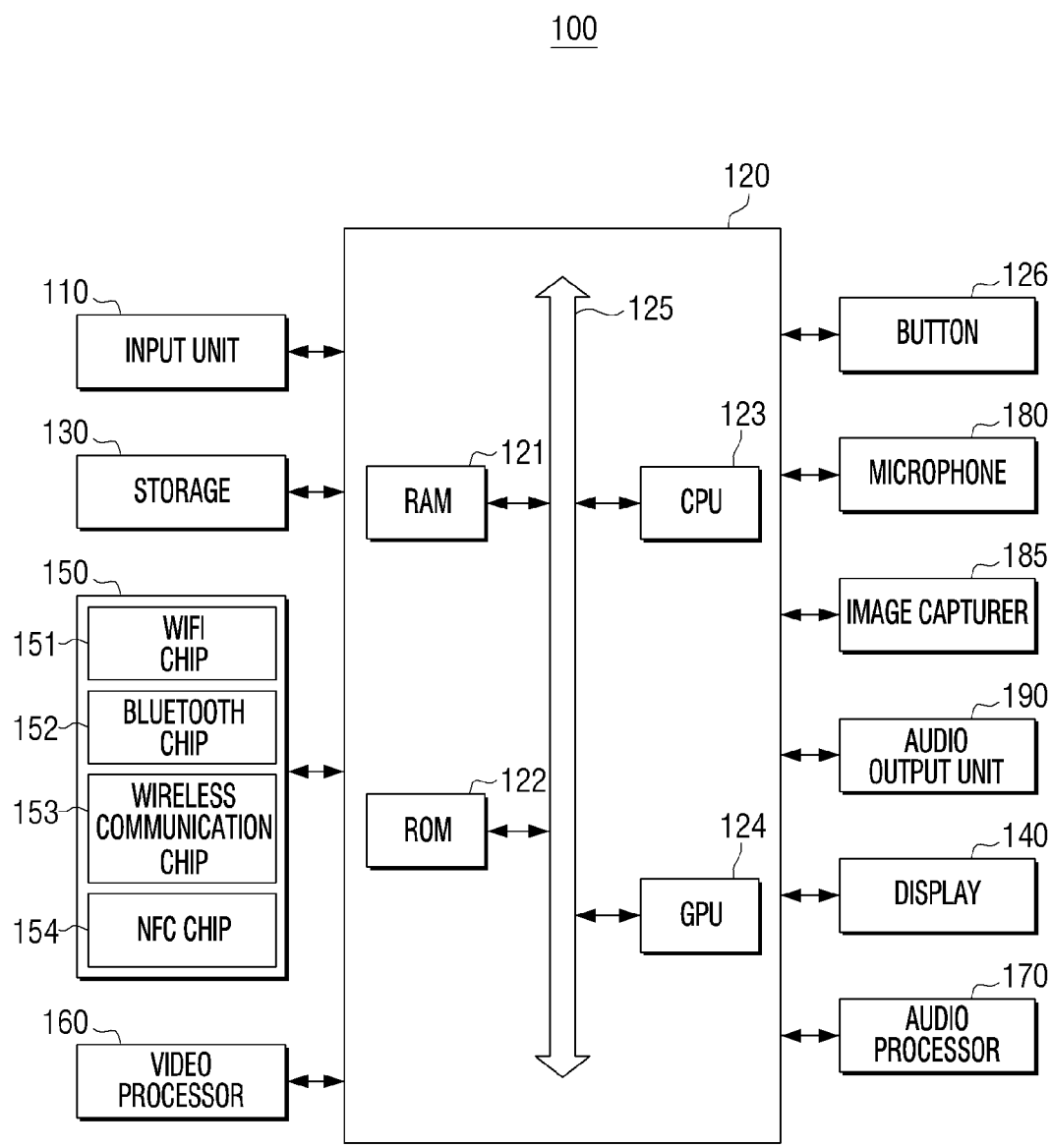
FIG. 2 is a block diagram for describing a detailed configuration of the image processing apparatus according to an embodiment of the disclosure.

FIG. 2 is a block diagram for describing a detailed configuration of the image processing apparatus according to an embodiment of the disclosure.

Referring to FIG. 2, the image processing apparatus 100 may include the input unit 110, the processor 120, a storage 130, a display 140, a communicator 150, a video processor 160, an audio processor 170, a button 126, a microphone 180, an image capturer 185, and an audio output unit 190. Here, the input unit 110 and the processor 120 are the same as those illustrated in FIG. 1, and an overlapped description will thus be omitted.

The storage 130 may store various programs and data required for an operation of the image processing apparatus 100. In detail, the optimized scale factor to be used to reduce the received image, the unit scale factor, or a corresponding number of times for which the image quality enhancement process is to be performed may be stored in the storage 130. At this time, the optimized scale factor or the number of times for which the image quality enhancement process is to be performed, which are stored, are calculated by a manufacturer through machine learning, and may be pre-stored at the time of release or may be updated through regular firmware update. Meanwhile, the storage 130 may also store an algorithm for deriving the optimized scale factor or the number of times for which the image quality enhancement process is to be performed.

Further, the storage 130 may store a plurality of low-definition images to be up-scaled to high-definition images. The processor 120 may generate a high-definition image based on a low-definition image selected by the user among the plurality of stored low-definition images.

Further, the storage 130 may store information on an optimized scale factor corresponding to a degree of degradation of an image. Here, optimized scale factors corresponding to degrees of degradation, respectively, may be stored in the form of the lookup table.

Further, the storage 130 may store a program, data, and the like for up-scaling a low-definition image. By doing so, the processor 120 may generate a high-definition image based on a received low-definition image by using the program and data stored in the storage 130, and may determine an optimized scale factor or a number of times for which the image quality enhancement process is performed, which is used in the up-scaling process, in some cases.

Meanwhile, the storage 130 may store or temporarily store intermediate images generated in the up-scaling process. In detail, the storage 130 may temporarily store an image obtained by partitioning the received image into a plurality of regions and reflecting the visual feature in the plurality of partitioned regions, thereby making it possible to perform the image quality enhancement process by overlapping the plurality of regions later. Then, the storage 130 may store or temporarily store a plurality of reference points and a plurality of visual features extracted from images reduced based on the plurality of reference points, respectively.

The display 140 may display an image subjected to the image quality enhancement process for the predetermined number of times. The display 140 may be implemented by various types of displays such as a liquid crystal display (LCD), an organic light emitting diode (OLED) display, a plasma display panel (PDP), and the like. A driving circuit, a backlight unit, and the like, that may be implemented in a form such as a-si, a thin film transistor (TFT), low temperature poly silicon (LTPS), a TFT, an organic TFT (OTFT), and the like, may be included in the display 140. In addition, the display 140 may be a flexible display.

Further, the display 140 may include a touch sensor for sensing a touch gesture of the user. The touch sensor may be implemented by various types of sensors such as a capacitive type sensor, a resistive type sensor, a piezoelectric type sensor, and the like. The capacitive touch sensor uses a scheme of calculating a touch coordinate by sensing micro electricity excited to a body of the user when a portion of the body of the user touches a surface of the display 140, using a dielectric material coated on the surface of the display 140. The resistive type sensor uses a scheme of calculating a touch coordinate by sensing that a current flows due to a vertical contact between two electrode plates embedded in the display 140 at a touch point in a case in which the user touches the screen. Further, in a case in which the image processing apparatus 100 supports a pen input function, the display 140 may sense a user gesture using input means such as a pen, in addition to the finger of the user. In a case in which the input means is a stylus pen including a coil therein, the image processing apparatus 100 may include a magnetic field sensor capable of sensing a magnetic field varying due to the coil in the stylus pen. As a result, the display 140 may also sense a proximal gesture, that is, hovering, in addition to the touch gesture.

Although it has been described above that both of the display function and the gesture sensing function are performed by the same component, these functions may be performed by different components, respectively. In addition, according to various embodiments, the image processing apparatus 100 may not include the display 140.

The communicator 150 is a component performing communication with various types of external devices in various types of communication manners. The communicator 150 includes a wireless fidelity (WiFi) chip 151, a Bluetooth chip 152, a wireless communication chip 153, and a near field communication (NFC) chip 154. The processor 120 may perform communication with various external devices using the communicator 150.

In detail, the communicator 150 may receive a low-definition image from an external device and transmit an image subjected to the image quality enhancement process performed by the processor 120 for the predetermined number of times to an external device such as a separate display device.

The WiFi chip 151 and the Bluetooth chip 152 perform communication in a WiFi manner and a Bluetooth manner, respectively. In a case of using the WiFi chip 151 or the Bluetooth chip 152, various kinds of connection information such as a service set identifier (SSID), a session key, and the like, are first transmitted and received, communication is connected using the connection information, and various kinds of information may then be transmitted and received. The wireless communication chip 153 means a chip performing communication depending on various communication protocols such as Institute of Electrical and Electronics Engineers (IEEE), Zigbee, $3^{rd}$ generation (3G), $3^{rd}$ generation partnership project (3GPP), long term evolution (LTE), and the like. The NFC chip 154 means a chip operated in the NFC manner using a band of 13.56 MHz among various radio frequency identification (RFID) frequency bands such as 135 kHz, 13.56 MHz, 433 MHz, 860 to 960 MHz, 2.45 GHz, and the like.

The processor 120 may include a random access memory (RAM) 121, a read only memory (ROM) 122, a central processing unit (CPU) 123, a graphic processing unit (GPU) 124, and a bus 125. The RAM 121, the ROM 122, the CPU 123, the GPU 124, and the like, may be connected to each other through the bus 125.

The CPU 123 accesses the storage 130 to perform booting using an operating system (O/S) stored in the storage 130. In addition, the CPU 123 performs various operations using various programs, contents, data, and the like, stored in the storage 130.

An instruction set for booting a system, or the like, is stored in the ROM 122. When a turn-on command is input to supply power, the CPU 123 may copy the O/S stored in the storage 130 to the RAM 121 according to an instruction stored in the ROM 122, and execute the O/S to boot the system. When the booting is completed, the CPU 123 copies various programs stored in the storage 130 to the RAM 121, and executes the programs copied to the RAM 121 to perform various operations.

The GPU 124 displays a user interface (UI) on the display 140 when the booting of the image processing apparatus 100 is completed. In detail, the GPU 124 may render a screen including various objects such as an icon, an image, a text, and the like, using a calculator (not illustrated) and a renderer (not illustrated). The calculator calculates attribute values such as coordinate values at which the respective objects are to be displayed, forms, sizes, colors, and the like, of the respective objects depending on a layout of a screen. The renderer renders screens with various layouts including objects based on the attribute values calculated in the calculator. The screens (or user interface windows) rendered in the renderer are provided to the display 140 and are displayed on a main display region and a sub display region, respectively.

The video processor 160 is a component for processing video data included in a content received through the communicator 150 or a content stored in the storage 130. In the video processor 160, various kinds of image processing such as decoding, scaling, noise filtering, frame rate conversion, resolution conversion, and the like, for the video data may be performed.

The audio processor 170 is a component for processing audio data included in the content received through the communicator 150 or the content stored in the storage 130. In the audio processor 170, various kinds of processing such as decoding, amplifying, noise filtering, and the like, for the audio data may be performed.

When a reproduction application for a multimedia content is executed, the processor 120 may drive the video processor 160 and the audio processor 170 to reproduce the multimedia content. In this case, the display 140 may display an image frame created by the image processor 160 in at least one of the main display region and the sub display region.

The audio output unit 190 outputs the audio data created by the audio processor 170.

The button 126 may be various types of buttons such as a mechanical button, a touch pad, a wheel, and the like, formed in any region such as a front surface portion, a side surface portion, a rear surface portion, and the like, of a body appearance of the image processing apparatus 100.

The microphone 180 is a component for receiving a user's voice or other sounds and converting the user's voice or other sounds into audio data. The processor 120 may use the user's voice input through the microphone 180 in a call process or convert the user's voice into audio data and store the audio data in the storage 130. Meanwhile, the microphone 180 may be implemented by a stereo microphone receiving a sound from a plurality of positions.

The image capturer 185 is a component for capturing a still image or a video according to a control of the user. The image capturer 185 may be implemented by a plurality of cameras such as a front camera and a rear camera. As described above, the image capturer 185 may be used as means for obtaining an image of the user, in an embodiment for tracking the gaze of the user.

In a case in which the image capturer 185 and the microphone 180 are provided, the processor 120 may perform a control operation depending on the user's voice input through the microphone 180 or a user's motion recognized by the image capturer 185. That is, the image processing apparatus 100 may be operated in a motion control mode or a voice control mode. In a case in which the image processing apparatus 100 is operated in the motion control mode, the processor 120 may activate the image capturer 185 to capture an image of the user, track a change in the user's motion, and perform a control operation corresponding to the tracked change. In a case in which the image processing apparatus 100 is operated in the voice control mode, the processor 120 may analyze the user's voice input through the microphone 180, and may be operated in a voice recognition mode of performing a control operation depending on the analyzed user's voice.

In the image processing apparatus 100 supporting the motion control mode or the voice control mode, a voice recognition technology or a motion recognition technology may be used in the diverse embodiments described above. For example, in a case in which the user takes a motion as if he/she selects an object displayed on a home screen or utters a voice instruction corresponding to the object, the image processing apparatus 100 may determine that the corresponding object is selected, and perform a control operation matched to the object.

Although not illustrated in FIG. 2, in some embodiments, a universal serial bus (USB) port to which a USB connector may be connected, various external input ports for connection to various external terminals such as a headset, a mouse, a local area network (LAN), and the like, a digital multimedia broadcasting (DMB) chip receiving and processing a DMB signal, various sensors, and the like, may be further included in the image processing apparatus 100.

Figure 3:
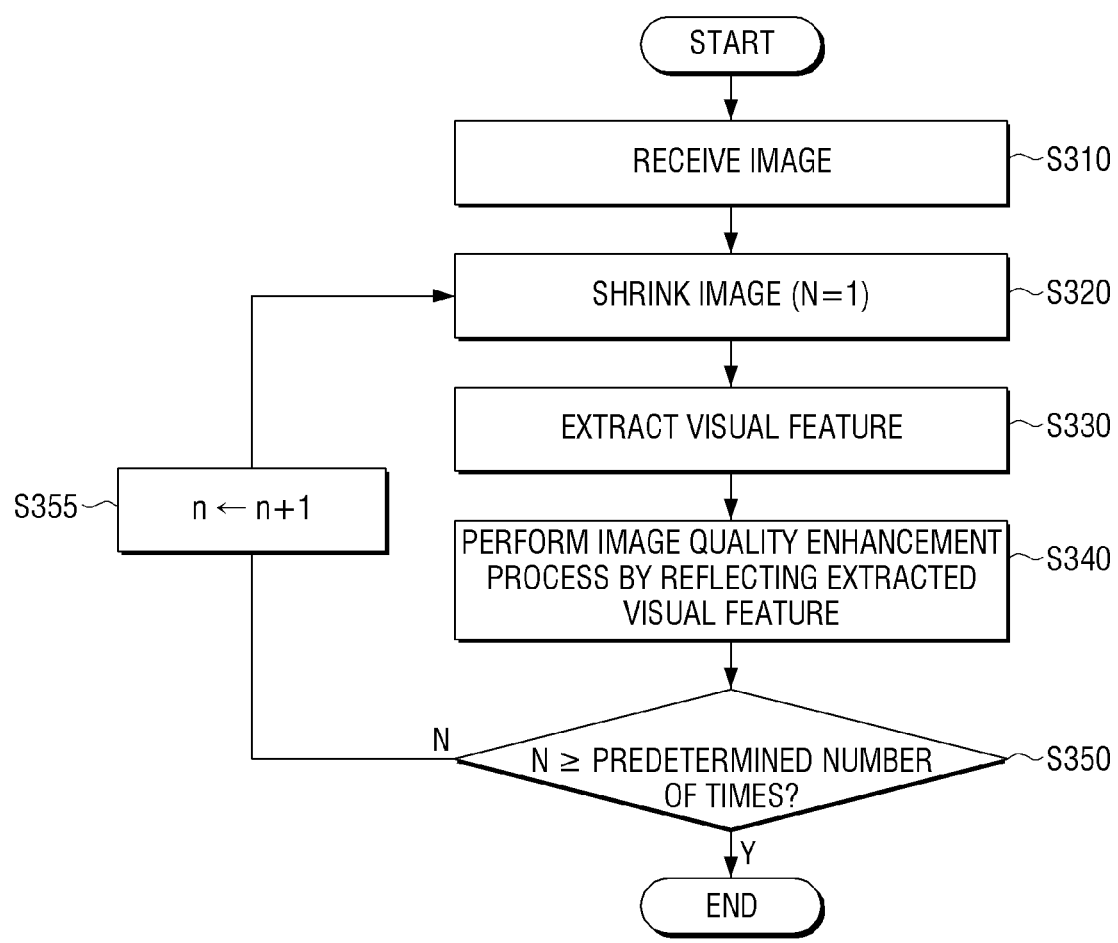
FIG. 3 is a flowchart schematically illustrating an image processing method according to an embodiment of the disclosure.

FIG. 3 is a flowchart schematically illustrating an image processing method according to an embodiment of the disclosure.

Referring to FIG. 3, an image may be received to the image processing apparatus, first (S310). In detail, the received image may be an image received from an external device or an image selected by the user among a plurality of images stored in the image processing apparatus.

Then, although not illustrated, the image processing apparatus may perform pre-processing for enhancing an image quality of the received image. In detail, the image processing apparatus may perform the pre-processing on the received image by using a conventional image up-scaling method. For example, the image processing apparatus may process the image so that the image includes a more clear edge, by detecting an edge based on a signal change of the image, and decreasing a width of a detected region or increasing intensity. This is only an embodiment, and the image processing apparatus may perform the pre-processing for enhancing the image quality of the received image by using various methods.

Then, although not illustrated, the image processing apparatus may determine whether or not a pattern region is present in the received image. In detail, the image processing apparatus may determine whether or not the pattern region is present in the received image by using a detected edge or the like in the received image. In the disclosure, the pattern region means a region including a shape, a pattern, or the like which may be visually distinguished in the image, and may be, but not limited to, a region in which specific shapes are regularly arranged. In detail, the image processing apparatus may determine that the pattern region is present in a case in which the received image signal is in a predetermined frequency range. In this case, the predetermined frequency range may be lower than a frequency range of a high frequency region determined as a texture region.

Further, the image processing apparatus may also determine whether or not the pattern region is present in the received image by using a filter which may extract an edge. Meanwhile, the disclosure is not limited thereto, and the image processing apparatus may also use a conventional algorithm which may determine whether or not the pattern region is present or extract the pattern region.

Meanwhile, in a case of using the conventional up-scaling method, up-scaling in the texture region in which a signal in the image has a high frequency may be insufficient. Then, in a case in which a high-definition image is generated by performing the up-scaling process once by using an optimal scale factor, a distortion phenomenon may occur in the pattern region. In this regard, an image processing according to the disclosure to be described below may enhance an image quality of the pattern region and the texture region without distortion in the pattern region.

Then, the image processing apparatus may reduce the received image (S320). Here, the image processing apparatus may recognize that the image quality enhancement process is performed on the received image for the first time (n=1). In detail, the image processing apparatus may reduce the received image to a predetermined ration, and the predetermined ratio, which is a minimum reduction ratio at which the effect of enhancing the image quality may be expected in a case of performing the image quality enhancement process, may be called a unit scale factor. At this time, the predetermined ratio may be determined by the user and may be a value in a range from 0.9 to 0.99, preferably, 0.95.

Meanwhile, in a case in which a pre-processing for enhancing the image quality of the received image is performed, the image processing apparatus may reduce the pre-processed image by using the unit scale factor.

Then, the image processing apparatus may extract a visual feature from the reduced image (S330). In detail, the image processing apparatus may extract a pattern feature and a texture feature indicating a texture from a frequency form of an image signal of each region in the image, shapes and density of edges included in the image, a color arrangement, or the like, in addition to attributes of the image, such as a brightness, a color, a darkness, a saturation, a contrast, and the like of the reduced image.

Meanwhile, the image processing apparatus may extract the visual feature from the reduced image itself, but the disclosure is not limited thereto. The image processing apparatus may also extract the visual feature in a state in which the received image is arranged as it is in a region other than a region in which the reduced image is arranged in the received image.

Meanwhile, in a case in which the pre-processing for enhancing the image quality of the received image is performed, the reduced image is a pre-processed image and the image processing apparatus may extract the visual feature from the image reduced after being pre-processed.

Then, the image processing apparatus may perform an image quality enhancement process by reflecting the extracted visual feature (S340). In detail, the image processing apparatus may perform the image quality enhancement process by partitioning the received image into a plurality of regions each of which has a size corresponding to a size of the reduced image, reflecting the extracted visual feature in each of the plurality of partitioned regions, and overlapping the plurality of regions, in which the visual feature is reflected, with each other. Here, the plurality of regions may partially overlap each other.

Meanwhile, the image processing apparatus may perform the image quality enhancement process by reflecting the extracted visual feature in the state in which the received image is arranged as it is in the region other than the region in which the reduced image is arranged in the received image. Meanwhile, a method of performing the image quality enhancement process by reflecting the extracted visual feature will be described in detail with reference to FIG. 4 later.

Meanwhile, in a case in which the pre-processing for enhancing the image quality of the received image is performed, the image processing apparatus may perform the image quality enhancement process by reflecting the visual feature extracted by reducing the pre-processed image, on the pre-processed image.

Then, the image processing apparatus may determine whether or not the image quality enhancement process is performed for a predetermined number of times (S350). In detail, the image processing apparatus may determine whether or not a number n of times for which the image quality enhancement process is performed reaches the predetermined number of times.

In detail, the predetermined number of times may be determined by comparing an optimized scale factor and the unit scale factor with each other. In other words, the predetermined number of times may be determined by comparing a reduction ratio, at which a high-definition image may be generated by performing the image quality enhancement process once, and the minimum reduction ratio with each other. The image processing apparatus may determine, by using the following Expression (1), the number N of times for which the image quality enhancement process is to be performed by using the unit scale factor in order to obtain the same effect as that may be obtained by performing the image quality enhancement process by using the optimized scale factor.

$$S=(U)^N \quad (1)$$

Here, S may represent the optimized scale factor and U may represent the unit scale factor.

For example, in a case in which the optimized scale factor is determined as 0.65 and the user selects the unit scale factor of 0.95, N is approximately 8.4, and thus the image processing apparatus may determine the number N of times for which the image quality enhancement process is to be performed as 8.

In this case, the optimized scale factor may be a predetermined value or may be a value determined depending on the received image. Meanwhile, a method of deriving the optimized scale factor in a case in which the optimized scale factor is a predetermined value will be described in detail with reference to FIG. 5 later. Meanwhile, a method of deriving the optimized scale factor in a case in which the optimized scale factor is a value determined depending on the received image will be described in detail with reference to FIG. 6 later.

Meanwhile, in a case in which the pre-processing for enhancing the image quality of the received image is performed, the image processing apparatus may reduce the pre-processed image by using the scale factor.

Meanwhile, in a case in which the number n of times for which the image quality enhancement process is performed reaches the predetermined number N of times (Y in S350), the image processing apparatus may stop the image quality enhancement process and output a finally processed image.

In contrast, in a case in which the number of times for which the image quality enhancement process is performed does not reach the predetermined number of times (N in S350), the image processing apparatus increases the number of times for which the image quality enhancement process is performed by 1 (n←n+1), and performs the image quality enhancement process again from the process (S320) of reducing the image.

Meanwhile, although not illustrated, the image processing apparatus may end the image processing when a desired image quality is obtained even in a case in which the image quality enhancement process is not performed for the predetermined number of times, and may perform the image quality enhancement process more times in a case in which the desired image quality is not satisfied.

In detail, the image processing apparatus does not perform the process (S350) of determining whether or not the number of times for which the image quality enhancement process is performed reaches the predetermined number of times, but directly determines an image quality of the processed image. In a case in which a desired image quality is obtained, the image processing apparatus ends the image processing, and in a case in which the desired image quality is not obtained, the number of times at which the image quality enhancement process is performed is increased by 1 (n←n+1) and the image processing apparatus performs the image quality enhancement process again from the process (S320) of reducing the image. Here, the image quality of the processed image may be determined by using a known technology such as a blind/referenceless image spatial quality evaluator (BRISQUE) and the like which may evaluate an image quality of the received image itself.

Meanwhile, the image processing apparatus may determine an image quality of the processed image before the process (S350) of determining whether or not the number of times for which the image quality enhancement process is performed reaches the predetermined number of times, and in a case in which a desired image quality is obtained, the image processing apparatus may end the image processing, and in a case in which the desired image quality is not obtained, the image processing apparatus may perform the process (S350) of determining whether or not the image quality enhancement process is performed for the predetermined number of times.

Meanwhile, the image processing apparatus may determine an image quality of the processed image even in a case in which the number of times for which the image quality enhancement process is performed reaches the predetermined number of times, and in a case in which a desired image quality is obtained, the image processing apparatus may end the image processing, and in a case in which the desired image quality is not obtained, the number of times at which the image quality enhancement process is performed may be increased by 1 (n←n+1) and the image processing apparatus may perform the image quality enhancement process again from the process (S320) of reducing the image.

As such, according to the disclosure, a high-definition image may be generated by reducing a low-definition image and using a visual feature extracted from the reduced low-definition image without an external database, thereby reducing memory footprint. Further, the image quality enhancement process is repeatedly performed by using the minimum reduction ratio at which an image quality is enhanced, thereby generating the high-definition image without a distorted region in the image.

Figure 4:
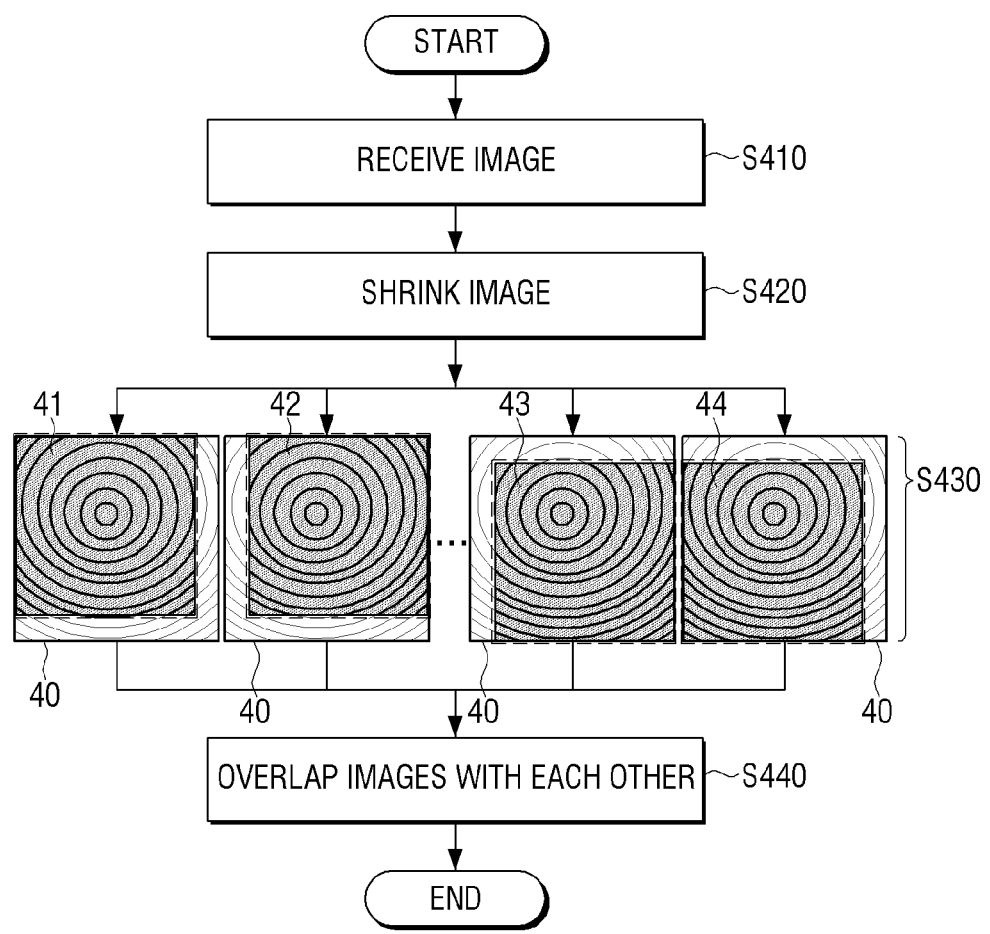
FIG. 4 is a flowchart schematically illustrating a method of applying a visual feature extracted in the image processing method according to an embodiment of the disclosure.

FIG. 4 is a flowchart schematically illustrating a method of applying a visual feature extracted in the image processing method according to the disclosure.

First, an image may be received to the image processing apparatus (S410). In detail, the received image may be an image received from an external device or an image selected by the user among a plurality of images stored in the image processing apparatus.

Then, although not illustrated, the image processing apparatus may perform pre-processing for enhancing an image quality of the received image. Then, although not illustrated, the image processing apparatus may determine whether or not a pattern region is present in the received image. The pre-processing process and the process of determining whether or not the pattern region is present are the same as those described with reference to FIG. 3, and thus an overlapped description will be omitted.

Then, the image processing apparatus may reduce the received image (S420). In detail, the image processing apparatus may reduce the received image to a predetermined ratio, and the predetermined ratio, which is a minimum reduction ratio at which the effect of enhancing the image quality may be expected in a case of performing the image quality enhancement process, may be called a unit scale factor.

At this time, the image processing apparatus may reduce the received image based on each of the plurality of reference points in the received image. For example, in a case in which the plurality of reference points are four vertices in the received image, the image processing apparatus may obtain four reduced images including an image obtained by reducing the received image to the predetermined ratio based on an upper-left vertex, an image obtained by reducing the received image to the predetermined ratio based on an upper-right vertex, an image obtained by reducing the received image to the predetermined ratio based on a lower-left vertex, and an image obtained by reducing the received image to the predetermined ratio based on a lower-right vertex.

Meanwhile, the plurality of reference points are not limited to the above description, and the number of reference numerals may be 4 or less or 6 or more, and a position of the reference point may be any position in the received image such as the center of the received image.

Meanwhile, in a case in which the pre-processing for enhancing the image quality of the received image is performed, the image processing apparatus may reduce the pre-processed image by using the unit scale factor.

Then, although not illustrated, the image processing apparatus may perform an image quality enhancement process by extracting a visual feature from the reduced image and reflecting the extracted visual feature in the received image (S430). In detail, the image processing apparatus may partition the received image 40 into the plurality of regions 41 to 44, and in this case, the plurality of regions may partially overlap each other. At this time, the image processing apparatus may reflect a visual feature extracted from the reduced image in each of the plurality of partitioned regions 41 to 44.

Meanwhile, the disclosure is not limited to the case in which the visual feature extracted from the reduced image itself is reflected only in the plurality of regions 41 to 44 as illustrated in the drawing. In a case in which the visual feature is extracted in a state in which the received image is arranged as it is in a region other than a region in which the reduced image is arranged in the received image, the visual feature extracted from the image in which the reduced image and the received image are arranged together may be reflected in respective corresponding pixels in the received image 40.

Meanwhile, in a case in which the received image is reduced based on the plurality of reference points and a plurality of visual features are extracted, the visual features extracted from the images reduced based on the reference points may be reflected in the plurality of regions, respectively, the reference points corresponding to the plurality of regions. For example, in a case in which the received image is reduced based on the upper-left vertex and the visual feature is extracted, the extracted visual feature may be reflected in an upper-left region sharing the reference point in the received image.

As such, in a case in which the image quality enhancement process is performed by reflecting the plurality of visual features extracted from the images reduced based on the plurality of reference points, respectively, in the plurality of respective corresponding regions, a better effect may be expected.

Meanwhile, a case in which the extracted visual feature is reflected in the plurality of partitioned regions simultaneously is illustrated in FIG. 4. However, in practice, the extracted visual feature may be sequentially reflected in the plurality of regions. In detail, the image processing apparatus may reflect the visual feature extracted from the reduced image in the upper-left region 41 and temporarily store an image of the upper-left region 41 in which the visual feature is reflected, reflect the visual feature extracted from the reduced image in the upper-right region 42 and temporarily store an image of the upper-right region 42 in which the visual feature is reflected, reflect the visual feature extracted from the reduced image in the lower-right region 43 and temporarily store an image of the lower-right region 43 in which the visual feature is reflected, and reflect the visual feature extracted from the reduced image in the lower-left region 44 and temporarily store an image of the lower-left region 44 in which the visual feature is reflected.

Then, the image processing apparatus may overlap the plurality of images in which the extracted visual feature is reflected (S440). As such, the image processing apparatus performs the image quality enhancement process by overlapping the plurality of regions with little possibility of distortion of the image each other, thereby making it possible to reduce a possibility that the distortion occurs when the image quality enhancement process is repeatedly performed.

Figure 5:
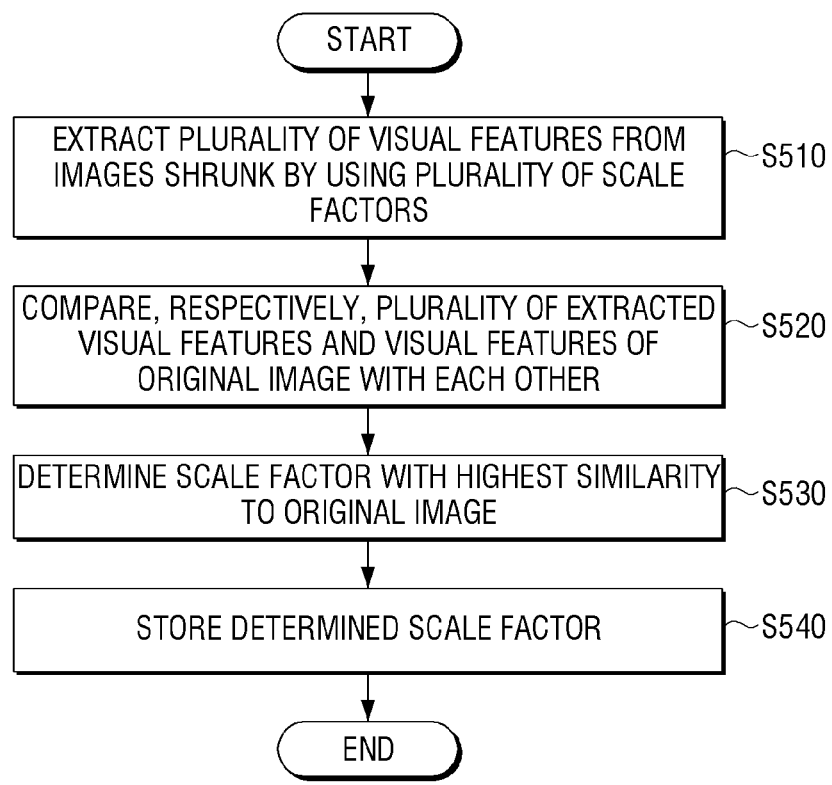
FIG. 5 is a flowchart illustrating a method of determining a scale factor according to an embodiment of the disclosure.

FIG. 5 is a flowchart illustrating a method of determining a scale factor according to an embodiment of the disclosure.

Here, although not illustrated in FIG. 5, a process of first receiving or storing an original image and a low-definition image of the original image may further included.

Referring to FIG. 5, the image processing apparatus may extract a plurality of visual features from images reduced by using a plurality of scale factors (S510). In detail, the image processing apparatus may reduce the received low-definition image by using each of the plurality of scale factors, and extract the visual features from the respective reduced images.

For example, the image processing apparatus may extract visual features from a plurality of reduced images reduced by using 5 scale factors including 0.1, 0.3, 0.5, 0.7, and 0.9. Then, the image processing apparatus may generate five images by reflecting each extracted visual feature in the received image.

At this time, the image processing apparatus may arrange the plurality of images reduced by using the respective scale factors so as to correspond to a size of the received image, and extract the visual features from the respective arranged images. For example, the image processing apparatus may arrange a plurality of images reduced by using a scale factor of 0.1 so as to correspond to the size of the received image, and extract visual features from the respective arranged images. Similarly, the image processing apparatus may reflect visual features in the case of using the respective scale factors including 0.3, 0.5, 0.7, and 0.9. Meanwhile, in practice, the scale factor is not limited to the values described above and the number of scale factors may be 4 or less or 6 or more.

Then, the image processing apparatus may compare the plurality of extracted visual features and visual features of the original image with each other, respectively (S520). In detail, the image processing apparatus may calculate feature maps with various sizes for the visual features of the original image and the plurality of extracted visual features, respectively, by using a multilayer method. Here, a layer relates to a size of the image, and as an index of the layer is increased, an entire size of the image is decreased. For example, in a case in which the index of the layer is small, a feature map for a narrow range in the image is calculated, and in a case in which the layer index is large, a feature map for a wider range in the image is calculated.

Further, a gram matrix ($G_{ij}^l$) for calculating a relation between feature maps as shown in Equation (1) may be calculated on each layer based on the calculated feature maps.

$$G_{ij}^l = \sum_k F_{ik}^l F_{jk}^l \qquad (1)$$

Here, l means an index of a layer, i and j mean indices of feature maps, and k means a pixel index.

In order for the visual feature extracted from the reduced image to be similar to the visual feature of the original image, gram matrices obtained on the respective layers need to be similar to each other. Therefore, the image processing apparatus obtains a difference ($E_L$) between a gram matrix of the visual feature of the original image and a gram matrix of the extracted visual feature on each layer L as shown in Equation (2).

$$E_L = \Sigma(\hat{G}^L - G^L)^2 \qquad (2)$$

Here, $G^L$ and $\hat{G}^L$ represents a gram matrix of the visual feature of the original image and a gram matrix of the extracted visual feature on an L-th layer, respectively.

Next, the image processing apparatus may calculate an average ($L(\vec{x}, \hat{\vec{x}})$) of differences between gram matrices of corresponding pixels of the visual features of the original images and gram matrices of corresponding pixels of the extracted visual features.

$$L(\vec{x}, \hat{\vec{x}}) = \sum_{i=0}^{L} \omega_l E_l \qquad (3)$$

Here, $\vec{X}$ and $\hat{\vec{X}}$ represents a pixel position of the visual feature of the original image and a pixel position of the extracted visual feature, respectively.

Then, the image processing apparatus may determine a scale factor corresponding to a visual feature with highest similarity to the visual feature of the original image among the plurality of extracted visual features (S530). Here, the highest similarity means that the average of the differences between the gram matrices is minimum. That is, the image processing apparatus may determine a scale factor corresponding to a visual feature of which an average of gram matrix differences from the visual feature of the original image is minimum, among the plurality of scale factors, as an optimized scale factor to be used for reducing the received image later.

Meanwhile, in practice, a scale factor that is the most suitable for generating a high-definition image similar to an original image may be determined through machine learning in which the above-described processes are repeatedly performed.

Then, the image processing apparatus may store the determined optimized scale factor (S540). Meanwhile, in some cases, the process of storing the optimized scale factor may be omitted.

Meanwhile, a case in which the optimized scale factor used for reducing a received low-definition image is obtained in the image processing apparatus has been described. However, in practice, the above-described process may be performed in an external device such as a server, and the image processing apparatus may also receive and use an optimized scale factor determined in an external device.

As described above, an optimized scale factor that may generate a high-definition image that is the most similar to the original image is determined through machine learning in which comparison with an original image is repeatedly performed, such that a high-definition image with well-rendered texture may be generated without using an external database when a low-definition image is input later.

Figure 6:
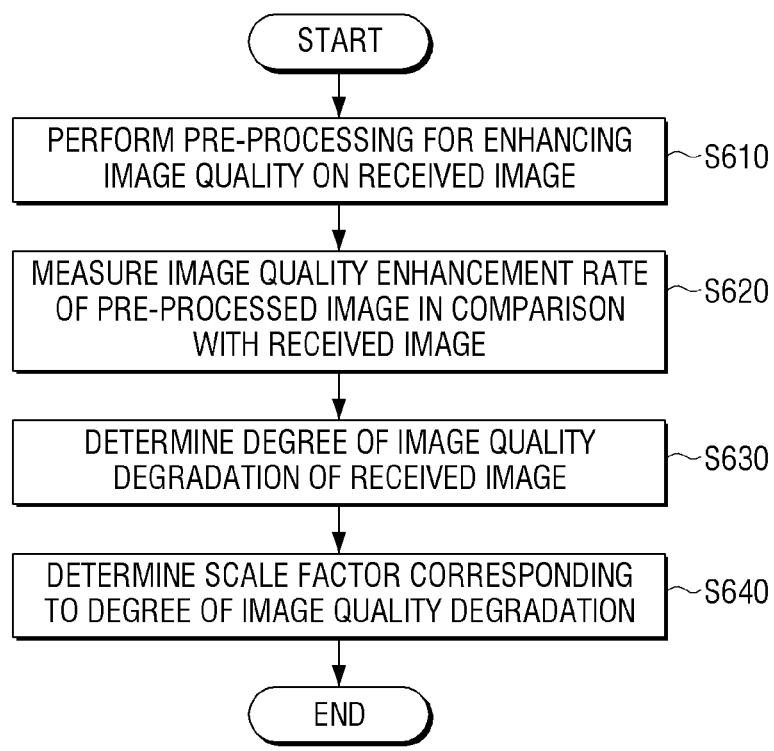
FIG. 6 is a flowchart illustrating a method of determining a scale factor according to another embodiment of the disclosure.

FIG. 6 is a flowchart illustrating a method of determining an optimized scale factor according to another embodiment of the disclosure.

Here, although not illustrated in FIG. 6, a process of first storing a scale factor corresponding to a degree of degradation of an image in a form of a lookup table may further included.

Referring to FIG. 6, the image processing apparatus may perform a pre-processing for enhancing an image quality on a received image (S610). In detail, the image processing apparatus may perform the pre-processing on the received image by using a conventional image up-scaling method. For example, the image processing apparatus may process the image so that the image includes a more clear edge, by detecting an edge based on a signal change of the image, and decreasing a width of a detected region or increasing intensity. This is only an embodiment, and the image processing apparatus may perform the pre-processing for enhancing the image quality of the received image by using various methods.

Then, the image processing apparatus may measure an image quality enhancement rate of the pre-processed image in comparison with the received image (S620). In detail, the image processing apparatus may measure the image quality enhancement rate of the pre-processed image by comparing an image quality of the received image and an image quality of the pre-processed image.

Then, the image processing apparatus may determine a degree of image quality degradation of the received image (S630). In detail, the image processing apparatus may determine the degree of image quality degradation of the received image by using the measured image quality enhancement rate of the pre-processed image. For example, the image processing apparatus may determine that the higher the image quality enhancement rate of the pre-processed image is, the higher the degree of image quality degradation of the received image is.

Then, the image processing apparatus may determine a scale factor corresponding to the determined degree of image quality degradation (S640). In detail, the image processing apparatus may determine a scale factor corresponding to the determined degree of image quality degradation in the stored lookup table as an optimized scale factor to be used to reduce the received image.

Meanwhile, a case in which the optimized scale factor is determined by using the degree of image quality degradation derived by comparing the image quality of the received image and the image quality of the pre-processed image has been described above. However, in practice, the optimized scale factor may also be determined by deriving the degree of image quality degradation from the image quality of the received image itself or the image quality of the pre-processed image quality itself.

As described above, the optimized scale factor is determined depending on various degrees of image quality degradation of various received images, thereby making it possible to generate a high-definition image with well-rendered texture without using an external database.

Figure 7:
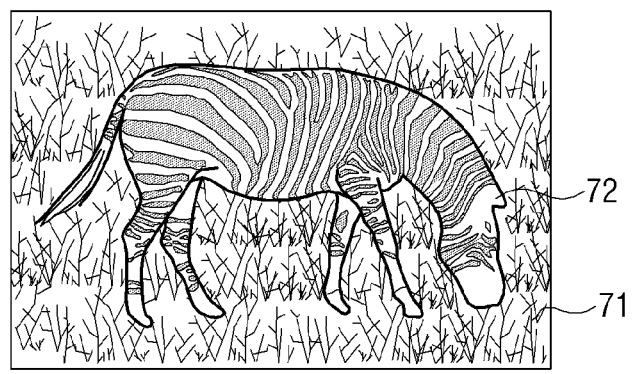
FIG. 7 is a view for describing an image having divided regions according to an embodiment of the disclosure.

FIG. 7 is a view for describing an image having divided regions according to an embodiment of the disclosure.

Referring to FIG. 7, an example of a received image 70 includes a zebra 72 standing on the grass 71. In detail, the received image 70 may include a grass 71 region in which an image signal has a high frequency because there are many edges that are difficult to distinguish, and a zebra 72 region in which the image signal has a low frequency because edges are relatively clear.

In this case, the image processing apparatus may generate a high-definition image by repeatedly performing the image quality enhancement process only on a partial portion of the received image 70. In detail, the image processing apparatus may divide the image into the region in which the image signal has a high frequency as a texture region, and the region in which the image signal has a relatively low frequency as a pattern region, and perform different image processings on the respective regions. In this case, the image processing apparatus may determine whether or not a pattern region having a predetermined frequency range is included in the received image, repeatedly perform the reducing, the extracting, and the image quality enhancement process on the pattern region in a case in which the pattern region is included in the received image, and perform the reducing, the extracting, and the image quality enhancement process on a region other than the pattern region only once. This will be described below in detail with reference to FIG. 8.

Figure 8:
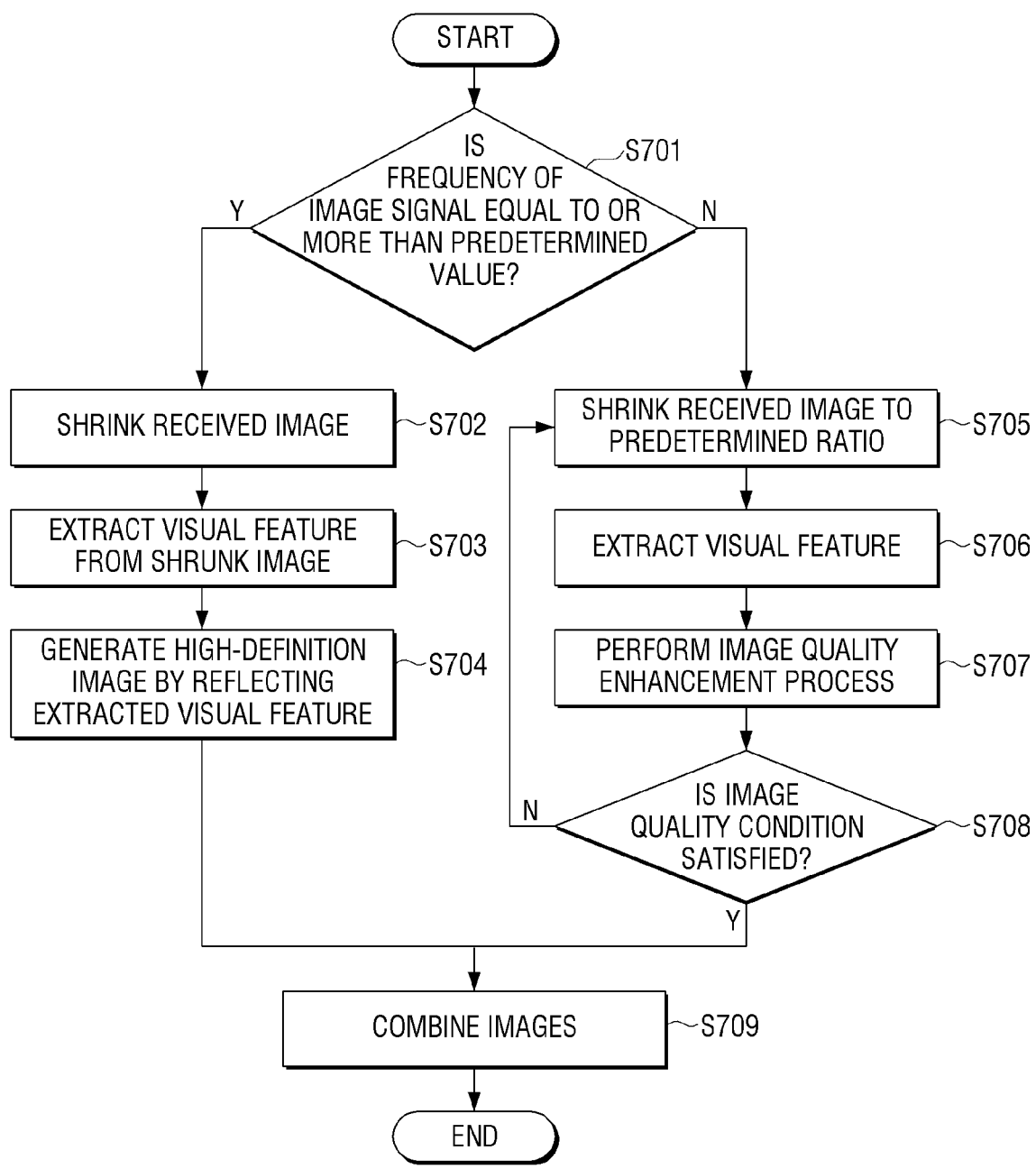
FIG. 8 is a flowchart for describing an image processing method for the image illustrated in FIG. 7.

FIG. 8 is a flowchart for describing an image processing method for the image illustrated in FIG. 7.

Referring to FIG. 8, the image processing apparatus may divide a received image into a plurality of regions based on a frequency of an image signal, first. In detail, the image processing apparatus may determine whether or not a frequency of the image signal of the received image is equal to or more than a predetermined value (S701).

In a case in which it is determined that the frequency of the image signal is equal to or more than the predetermined value in a region in the image signal (Y in S701), the image processing apparatus may reduce the received image (S702). At this time, the region in which the frequency of the image signal is equal to or more than the predetermined value may be the texture region. Meanwhile, the image processing apparatus may reduce the received image by using a predetermined optimized scale factor or an optimized scale factor determined depending on a degree of degradation of the received image.

Meanwhile, although not illustrated, the image processing apparatus may perform pre-processing for enhancing an image quality of the received image and then reduce the pre-processed image.

Then, the image processing apparatus may extract a visual feature from the reduced image (S703). At this time, the image processing apparatus may also arrange a plurality of reduced images so as to correspond to a size of the received image before extracting the visual feature, and extract visual features from the respective arranged images.

Then, the image processing apparatus may generate a high-definition image by reflecting the extracted visual feature in the received image (S704). In detail, the image processing apparatus may generate the high-definition image by partitioning the received image into a plurality of regions each of which has a size corresponding to a size of the reduced image, and applying a visual feature extracted from the reduced image in each partitioned region. Meanwhile, in a case in which the visual features are extracted from the image in which a plurality of reduced images are arranged, the image processing apparatus may generate the high-definition image by applying the visual features in positions corresponding to the arranged images, respectively, in the received image. Then, the image processing apparatus may also generate the high-definition image by repeatedly applying the extracted visual feature in the received image.

Meanwhile, in a case in which it is determined that the frequency of the image signal is less than the predetermined value in a region (N in S701), the image processing apparatus may reduce the received image to a predetermined ratio (S705). At this time, the region in which the frequency of the image signal is less than the predetermined value may be the pattern region.

Then, the image processing apparatus may extract a visual feature from the reduced image (S706). Meanwhile, although not illustrated, the image processing apparatus may perform pre-processing for enhancing an image quality of the received image and then reduce the pre-processed image.

Then, the image processing apparatus may perform an image quality enhancement process by reflecting the extracted visual feature in the received image (S707).

Then, the image processing apparatus may determine an image quality of the image subjected to the image quality enhancement process satisfies an image quality condition (S708). At this time, the image processing apparatus may determine whether or not the predetermined image quality condition is satisfied depending on whether or not the image quality enhancement process is performed for a predetermined number of times derived by using the optimized scale factor and the unit scale factor. Alternatively, whether or not the predetermined image quality condition is satisfied may also be determined by determining an image quality of the image subjected to the image quality enhancement process itself.

In a case in which it is determined that the image quality of the image subjected to the image quality enhancement process satisfies the image quality condition (Y in S708), the image processing apparatus may combine the high-definition image of the texture region and the image of the pattern region subjected to the image quality enhancement process.

Meanwhile, in a case in which it is determined that the image quality of the image subjected to the image quality enhancement process does not satisfy the image quality condition (N in S708), the image quality enhancement process may be performed again from the process (S705) of reducing the image subjected to the image quality enhancement process to the predetermined ratio. A detailed description thereof has already been provided with reference to FIGS. 1, 3, and 4, and thus an overlapped description will be omitted.

Meanwhile, although a case in which the received image is divided into two regions and the image quality enhancement process is performed on the regions for different numbers of times by using different scale factors, respectively has been described above, the received region may be divided into three or more regions and processed.

Further, different scale factors may also be applied for each frame.

As described above, various scale factors are applied depending on a feature of the image, such that a generally higher-definition image may be generated even in a case where a low-definition image in which a texture region in which texture is rendered and a non-texture region are mixed is input.

According to various embodiment described above, a high-definition image may be generated by reducing a low-definition image and using an extracted visual feature without an external database, thereby reducing memory footprint and time required for up-scaling. Further, the image quality enhancement process is repeatedly performed by using the minimum reduction ratio at which an image quality is enhanced, thereby generating the high-definition image without a distorted region in the image.

Meanwhile, the diverse embodiments of the disclosure described above may be implemented in a computer or a computer readable recording medium using software, hardware, or a combination of software and hardware. As an example, according to a hardware implementation, the embodiments described in the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions. In some cases, the embodiments described in the disclosure may be implemented by the processor 120 itself. According to a software implementation, the embodiments such as procedures and functions described in the disclosure may be implemented by separate software modules. Each of the software modules may perform one or more functions and operations described in the disclosure.

Meanwhile, the methods for controlling a display apparatus according to the diverse embodiments of the disclosure described above may be stored in a non-transitory readable medium. The non-transitory readable medium may be mounted and used in various apparatuses.

The non-transitory computer-readable medium is not a medium that stores data therein for a while, such as a register, a cache, a memory, or the like, but means a medium that semi-permanently stores data therein and is readable by an apparatus. In detail, programs for performing the diverse methods described above may be stored and provided in the non-transitory readable medium such as a compact disc (CD), a digital versatile disc (DVD), a hard disc, a Blu-ray disc, a universal serial bus (USB), a memory card, a read only memory (ROM), or the like.

Although embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure.

The invention claimed is:

1. An image processing apparatus comprising:
an input unit configured to receive an image; and
a processor configured to determine a degradation state of the received image, determine a predetermined ratio based on the determined degradation state, reduce the received image to the predetermined ratio, extract a visual feature from the reduced image, perform an image quality enhancement process in which the extracted visual feature is reflected in the received image, and repeatedly perform, for a predetermined number of times, the reducing, the extracting, and the image quality enhancement process on the image subjected to the image quality enhancement process,
wherein the processor performs the image quality enhancement process by partitioning the received image into a plurality of regions each of which has a size corresponding to a size of the reduced image, reflecting the extracted visual feature in each of the plurality of partitioned regions, and overlapping the plurality of regions, in which the extracted visual feature is reflected, with each other.

2. The image processing apparatus as claimed in claim 1, wherein the processor reduces the received image based on each of a plurality of reference points in the received image and extracts a visual feature from each of a plurality of reduced images.

3. The image processing apparatus as claimed in claim 2, wherein the plurality of reference points correspond to the plurality of regions, respectively, and
the processor reflects visual features in the plurality of partitioned regions, respectively, the visual features being extracted from the images reduced based on the reference points corresponding to the plurality of regions.

4. The image processing apparatus as claimed in claim 1, wherein the extracted visual feature is at least one of a brightness, a color, a darkness, a saturation, a contrast, shapes and density of edges, or a color arrangement.

5. The image processing apparatus as claimed in claim 1, wherein the predetermined ratio is a value in a range from 0.9 to 0.99.

6. The image processing apparatus as claimed in claim 1, wherein the processor determines the predetermined number of times for which the reducing, the extracting, and the image quality enhancement process are repeatedly performed, depending on the determined degradation state.

7. The image processing apparatus as claimed in claim 1, wherein the processor performs a pre-processing for enhancing an image quality of the received image, and performs the image quality enhancement process by reflecting a visual feature extracted from a reduced image in which the pre-processed image is reduced by the predetermined ratio, on the pre-processed image.

8. The image processing apparatus as claimed in claim 1, wherein the processor determines whether or not a pattern region having a predetermined frequency range is included in the received image, repeatedly performs the reducing, the extracting, and the image quality enhancement process on the pattern region in a case in which the pattern region is included in the received image, and performs the reducing, the extracting, and the image quality enhancement process on a region other than the pattern region only once.

9. The image processing apparatus as claimed in claim 1, further comprising: a display configured to display the image repeatedly subjected to the image quality enhancement process for the predetermined number of times.

10. The image processing apparatus as claimed in claim 1, further comprising: a communicator configured to transmit, to a display device, the image repeatedly subjected to the image quality enhancement process for the predetermined number of times.

11. An image processing method comprising:
receiving an image;
determining a degradation state of the received image;
determining a predetermined ratio based on the determined degradation state;
reducing the received image to the predetermined ratio;
extracting a visual feature from the reduced image;
performing an image quality enhancement process in which the extracted visual feature is reflected in the received image; and
repeatedly performing, for a predetermined number of times, the reducing, the extracting, and the image quality enhancement process on the image subjected to the image quality enhancement process,
wherein the performing of the image quality enhancement process comprises:
partitioning the received image into a plurality of regions each of which has a size corresponding to a size of the reduced image;
reflecting the extracted visual feature in each of the plurality of partitioned regions; and
overlapping the plurality of regions, in which the extracted visual feature is reflected, with each other.

12. The image processing method as claimed in claim 11, wherein in the reducing, the received image is reduced based on each of a plurality of reference points in the received image, and
in the extracting, a visual feature is extracted from each of a plurality of reduced images.

13. The image processing method as claimed in claim 12, wherein the plurality of reference points correspond to the plurality of regions, respectively, and
in the reflecting, visual features are reflected in the plurality of partitioned regions, respectively, the visual features being extracted from the images reduced based on the reference points corresponding to the plurality of regions.

* * * * *